(12) United States Patent
Lejeune et al.

(10) Patent No.: US 8,559,679 B2
(45) Date of Patent: Oct. 15, 2013

(54) METHOD AND APPARATUS TO DETERMINE THE START OF FLOWERING IN PLANTS

(75) Inventors: Pierre Lejeune, Dolembreux (BE); Frederik Leyns, Oosterzele (BE)

(73) Assignee: CropDesign N.V., Zwijnaarde (BE)

( * ) Notice: Subject to any disclaimer, the term of this patent is extended or adjusted under 35 U.S.C. 154(b) by 1017 days.

(21) Appl. No.: 12/279,353

(22) PCT Filed: Feb. 19, 2007

(86) PCT No.: PCT/EP2007/001422
§ 371 (c)(1), (2), (4) Date: Jan. 7, 2009

(87) PCT Pub. No.: WO2007/093444
PCT Pub. Date: Aug. 23, 2007

(65) Prior Publication Data
US 2009/0226042 A1    Sep. 10, 2009

(30) Foreign Application Priority Data
Feb. 17, 2006   (EP) .................................. 06110081

(51) Int. Cl.
*G06K 9/00* (2006.01)
*A01G 31/02* (2006.01)
*A01H 5/00* (2006.01)
*B02B 5/00* (2006.01)

(52) U.S. Cl.
USPC .................. 382/110; 47/65; 800/298; 241/7

(58) Field of Classification Search
USPC .................... 382/110; 47/65; 800/298; 241/7
See application file for complete search history.

(56) References Cited

U.S. PATENT DOCUMENTS

| 2004/0200146 A1* | 10/2004 | Leyns et al. ........................ 47/65 |
| 2007/0289211 A1* | 12/2007 | Lejeune et al. .................... 47/65 |
| 2009/0288226 A1* | 11/2009 | Hallahan et al. ............... 800/287 |
| 2010/0257633 A1* | 10/2010 | Pogson et al. ................. 800/278 |

FOREIGN PATENT DOCUMENTS

| DE | 3906215 A1 | 8/1990 |
| JP | 2002-203242 A | 7/2002 |
| JP | 2005-26873 A | 1/2005 |

* cited by examiner

*Primary Examiner* — Amara Abdi
(74) *Attorney, Agent, or Firm* — Novak Druce Connolly Bove + Quigg LLP

(57) ABSTRACT

The present invention relates generally to the field of plant breeding and concerns a method for determining the point at which a plant starts to flower. More specifically, the invention concerns a method for determining the start of flowering on an individual plant basis by measuring the reproductive structures of plants from digital images of these structures and deducing the start of flowering from the measurements and average growth rates. The invention also concerns apparatus for determining the start of flowering in plants, particularly in a high-throughput manner.

11 Claims, 3 Drawing Sheets

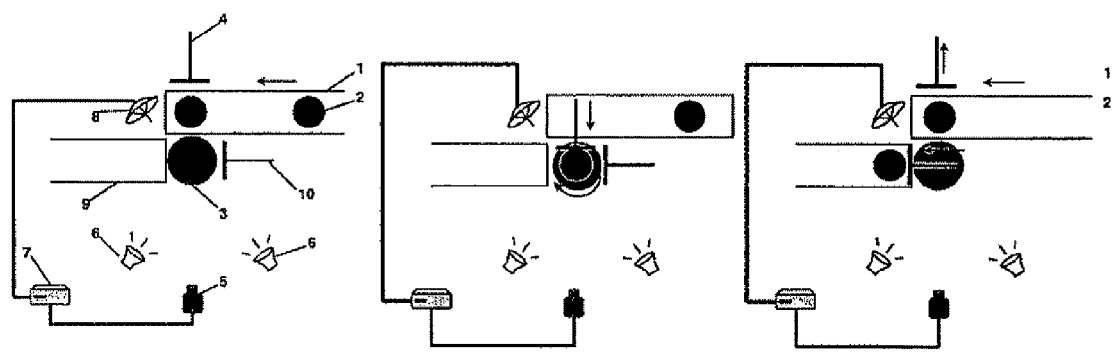
FIGURE 1 A (top view)
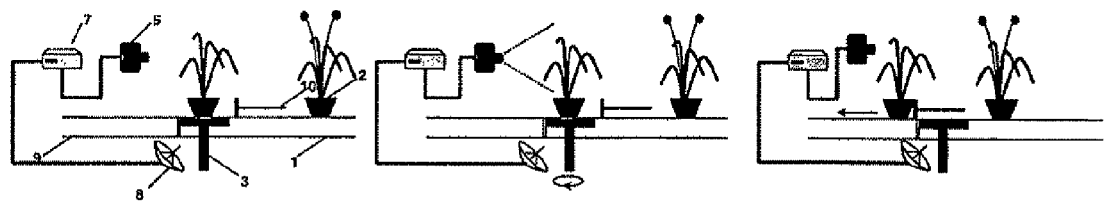
FIGURE 1 B (side view)

METHOD AND APPARATUS TO DETERMINE THE START OF FLOWERING IN PLANTS

RELATED APPLICATIONS

This application is a national stage application (under 35 U.S.C. 371) of PCT/EP2007/001422 filed Feb. 19, 2007, which claims benefit of European application EP06110081 filed Feb. 17, 2006.

The present invention relates generally to the field of plant breeding and concerns a method for determining the point at which a plant starts to flower. More specifically, the invention concerns a method for determining the start of flowering on an individual plant basis by measuring the reproductive structures of plants from digital images of these structures and deducing the start of flowering from the measurements and average growth rates. The invention also concerns apparatus for determining the start of flowering in plants, particularly in a high-throughput manner.

Plant development is composed of two distinct phases, namely a vegetative phase and a reproductive phase; the transition between these two phases represents the start of flowering. During the vegetative phase, the plant builds up light-harvesting structures (typically in the form of stems and leaves and other green parts) and nutrient-capturing structures (typically in the form of roots). During the reproductive stage, plant resources are directed to structures involved in flower and seed development and to the production of reserve carbohydrates for storage in reproductive structures, such as seeds and fruits. The length of the vegetative phase determines the size of the light-harvesting structures, which in turn determines the amount of reserve carbohydrates that can be produced and subsequently stored in the reproductive structures. At a certain moment in time, the vegetative phase will end allowing reproductive development to proceed and to be completed before the end of the growing season. The length of the growing season is dependent on seasonal factors and can differ widely from one location to the next. A wide range of environmental signals control the transition of the vegetative phase into the reproductive phase. Important signals are day length, temperature (vernalisation), nutrient and water availability and phytohormones, such as gibberellic acid (GA). These signals induce a shift in vegetative apical meristem identity, named the floral transition, and this transition establishes the inflorescence meristem. Whereas the product of the vegetative apical meristem are leaf primordia, the inflorescence meristem produces primordia that differentiate into secondary inflorescences during early generative development and into flowers later in this stage.

This transition between the vegetative phase and reproductive phase is a critical developmental event in the plant life cycle, and being the first step of sexual reproduction, it is of great importance in agriculture, horticulture and plant breeding. The ability to accurately measure the start of flowering would be of great benefit to the agricultural and breeding industries where plants are frequently bred and selected for flowering-related traits, such as early or late flowering, and even non flowering traits. This would have many benefits, such as optimising yield (this is especially important in plants cultivated for seed or fruit), to distinguish early and late varieties and to provide plants that have a life cycle well adapted to a given growing season or growing condition at a given location.

Conventional methods for determining the start of flowering include dissecting plants under magnification to determine the presence of either a vegetative or reproductive structure at the meristem. This technique suffers from several drawbacks, such as the subjective nature of the technique, its low accuracy and its time-consuming nature, which does not lend itself well to breeding which typically involves large numbers of plants. Furthermore, dissected plants are generally no longer viable.

A less time-consuming method often used by plant breeders to determine the start of flowering is to monitor emergence of the inflorescence, otherwise known as "emergence" or "heading time". Heading time is defined as the moment when the first inflorescence is exerted from the leaf sheaths and becomes visible to the naked eye. This method however provides a poor estimation of the start of flowering since the start of flowering may have occurred days or even weeks before emergence of the inflorescence is noticed.

A further method for determining the start of flowering is to monitor anthesis, which is the moment pollen is released from the anthers. This method suffers from the drawback that it is limited to open-pollinating species where the anthers are clearly visible.

A widely used method for determining the start of flowering in crops in the field involves repeated visual inspection of plots to estimate the number of flowering plants present in a plot. It is conventionally accepted in agronomics that a plot is "flowering" when 50% of plants in a plot exhibit emerged inflorescences. This technique will give a rough idea as to whether a group of plants is flowering, but is not suitable for determining the start of flowering on an individual plant basis. However differences on an individual plant basis can be important, for example the harvesting of grains or fruits is best achieved when all plants are mature, which means that the late flowering individuals determine harvest time, with the risk that early individuals become over-ripe or lose their seeds or fruits. Similarly, if harvest is triggered by the early flowering individuals there is a risk of a harvest with unripe material.

The main drawbacks associated with these conventional methods are their reliance on inspection by eye and the associated subjective nature of such inspection. For example, the observations made by one individual may differ widely from those made by another. Factors such quality and quantity of light, time of day etc. will also influence the accuracy of the readings. Furthermore, to ensure good breeding practice, a resolution of between one and two days difference in flowering time is desirable, which would typically require daily observations during the pre- and post-flowering period; this would of course require considerable manpower. The effect of some variables may be controlled or at least minimised, for example by having the same individual make the observations, however other factors are much harder to control, especially in the field.

It is therefore an object of the present invention to provide means to determine the start of flowering which alleviate some of the aforementioned problems.

Therefore, according to a first embodiment of the present invention, there is provided a method for determining the start of flowering comprising the steps of:
  (i) Digitally imaging an inflorescence of a plant; and
  (ii) Measuring the inflorescence from the digital image; and
  (iii) Calculating the start of flowering from the average growth rate of inflorescences and the measurements derived from step (ii).

The term 'inflorescence' as used herein is taken to broadly mean a reproductive structure. The form of the inflorescence may vary depending on the plant species in question, however a person skilled in the art would be well aware of the relevant structure(s) to be measured.

Advantageously, the method of the invention allows the start of flowering to be accurately determined on an individual plant level.

Furthermore, the method provides means to discriminate flowering and non-flowering plants from the presence or absence of an inflorescence.

The dimensions (typically the area, but this may also be the length and/or width) of the inflorescence is measured from the digital image and using this information and the average growth rate for inflorescences (of the plant species or variety in question) one may back calculate the point of emergence of the inflorescence. For example, the average growth rate of an inflorescence of a particular plant species or variety is 10 cm per day, and the observed size of an inflorescence of a plant of the same species or variety is 30 cm, therefore it can be deduced that the inflorescence appeared 3 days before the moment of the observation. Therefore the start of flowering would also have been 3 days before the moment of the observation.

The method of the invention to determine the start of flowering requires a detectable and measurable inflorescence to be present at the time of imaging, however this need not be the first inflorescence. Furthermore, the inflorescence should not have reached its maximum size at the time of imaging. This would require observations of a sufficient frequency so that at least one observation is performed between emergence of the inflorescence and before it reaches its maximum size. The frequency of observations can readily be determined by a person skilled in the art and will of course depend upon the species or variety in question.

The method of the invention is particularly suited to handling large numbers of plants in a high throughput manner, especially in a greenhouse environment, whilst retaining a high level of accuracy, since the start of flowering can be determined on an individual plant level. The advantage of a greenhouse is that plants can be grown on a defined substrate so that any variability due to local soil conditions is minimized. Also, the amount of water and nutrients given to the plants can be controlled.

According to a second embodiment of the present invention, there is provided an apparatus for determining the start of flowering, which apparatus comprises:

(i) Transporter means for supporting and moving a container in which one or more plant is growing;
(ii) One or more digital cameras with sufficient resolution for imaging emerging plant inflorescences;
(iii) Computer means for detecting and measuring plant inflorescences and for deriving the start of flowering from said measurements and average growth rates of inflorescences.

In the embodiment described above, plants are moved on transporter means, typically in the form of one or more conveyor belts (endless belts), to a station where the one or more digital cameras take images of the plant inflorescences. An alternative embodiment may also be envisaged in which the plants are stationary and where the one or more digital cameras are arranged to move over the plants to take images of the plant inflorescences. The embodiment in which plants are moved is however preferable since the effect of local environmental conditions may be minimised.

The container in which one or more plant is growing may be a pot, tray, or the like. Preferably, the container is a classical plant pot. The growing medium may be any substrate suited for growing plants. Plants may be organized so that plants belonging to a given experimental group can be easily retrieved and transported to an imaging station. Preferably, the plants will be grown in a greenhouse and plants belonging to the same experimental group are randomized in order to reduce the effect of local environmental conditions. Plants can be retrieved and transported to the imaging station manually, however, where large samples (of the order of say several thousands) are to be evaluated, the process may be further automated by having a system of retrieving plants from a location where they are cultivated in the greenhouse and presenting the pots sequentially to a camera, recording images of the plants, and returning the plants to their original location or to another location, all without human intervention except that of selecting, by means of a computer program, the series of plants for which an evaluation of flowering time is desired. In general, a minimum of 500 plants per hour may be imaged and analysed using the apparatus of the invention.

Preferably, each container or plant has an associated unique identifier allowing information concerning that plant or container of plants to be linked to that unique identifier in a computer database. The type of information which could be useful to record may include the species, cultivar, parental information, the presence of a transgene, a transgene identifier, an experiment group, sowing date, inflorescence measurements and/or other measurements (with a date stamp), and any other quantitative or qualitative observations made on the plant. Data contained in the database can be retrieved by means of appropriate software. These data may be statistically analysed to discriminate groups of plants with differing flowering time characteristics and to identify plants having interesting traits. The use of unique identifiers allows plants to be selected based on traits of interest for further breeding or for commercial use. Preferably, the identifier is a transponder but any other suitable means such as barcodes may also be used.

Plants on the transporter means are moved to an imaging station. Plants should be presented to the camera in such a way that individual plants can be discriminated and identified. This allows assessment of population homogeneity for flowering time using existing statistical techniques. Digital cameras suitable for imaging emerging plant inflorescences are those allowing the inflorescences imaged to have a minimum size of about 100 pixels.

The computer means for detecting and measuring plant inflorescences comprises image-processing software. Typically, such software uses features specific to inflorescences to distinguish these from, say, vegetative organs (stems and leaves). For example, flowers often exhibit a different colour and/or texture than the rest of the plant. In the case of some cereals, like rice or wheat, where the range of colours displayed by immature inflorescences is close to that of stems or leaves, the software uses differences in shape and pattern to distinguish from the more granular structure of the inflorescence which results in a higher pixel-to-pixel variation than that of the leaves or stem. Topological cues can also be used to refine detection. For example, inflorescences are usually found at the top of the plant and they are always connected to a stem.

FIG. 2 shows example digital images of rice plants from which the plant inflorescences may be measured. A of FIG. 2 is the starting or original image. This image is subjected a so-called "thresholding" process involving removal of all non-plant parts. Thresholding is achieved by virtue of the background and non-plant parts exhibiting a different colour range to the plant organs. B of FIG. 2 shows the image after thresholding. This is followed by a statistical method termed "colour variation analysis" which is applied to the remaining pixels to determine which parts exhibit textural properties akin to that of inflorescences. C of FIG. 2 shows the image after colour variation analysis. Previous knowledge of inflorescence colour and texture would be required for this step. Objects classified as "non-inflorescence" through the process of colour variation analysis are removed. Finally, the dimensions of the remaining objects, classified as "inflorescences", are recorded by the software. Since some parts of the inflorescences can be hidden by other plant parts, such as leaves, it is preferable to refine the measurements by averaging the results obtained from several pictures, say at least 3 pictures or images and generally not more than 6.

Statistical analysis may also be carried out on data collected using the unique identifier. For example, statistical data analysis to determine the start of flowering may be based on the following three steps. The first step corrects for the presence of an inflorescence based on logic rules, i.e. assumes that there is consistency between the six pictures or images taken of any one image, that there are no inflorescences on plants that are smaller than a certain size and that inflorescences do not disappear once present. The second step estimates the speed of inflorescence growth in the entire batch of plants. In this step, inflorescence size is corrected for plant size, an exponential inflorescence growth is assumed in the first week of growth and a date for inflorescence emergence is estimated for each plant. In the third step, population means of the inflorescence emergence date and standard errors on these estimates are calculated based on survival method (Cox models).

If, for example, plants are imaged at weekly intervals, the presence of an inflorescence on an image allows the start of flowering to be determined with a resolution of one week. More thorough data analysis making use of inflorescence size may be used to interpolate between two images and to determine the start of flowering with a lower resolution for individual plants. More thorough data analysis making use of inflorescence size may also be used to provide more reliable estimates of the mean start of flowering for a population of plants considering the presence of plants that were not flowering at the time of last imaging.

The method and the apparatus of the invention are suitable for any plant. Preferred plants are cereals, such as rice, wheat, and corn. Also preferred are plants such as soybean, cotton and oilseed rape/canola.

The word "comprising" where used herein is intended to encompass the notion of "including" and the notion of "consisting essentially of".

The invention will now be described, by way of example, with reference to the accompanying drawings, in which:

FIG. 1a is a schematic representation of the apparatus of the invention viewed from the top (top view), and FIG. 1b is a schematic representation of the apparatus of the invention viewed from the side (side view).

In both FIG. 1a and FIG. 1b, the drawings to the left represent the elements of the apparatus at the start of the picture acquisition cycle. The middle drawings represent the elements of the apparatus during the recording of the picture. The drawings to the right represent the elements of the apparatus at the end of the picture acquisition cycle. Arrows indicate the direction of the movement of the mobile elements.

Figure 2:
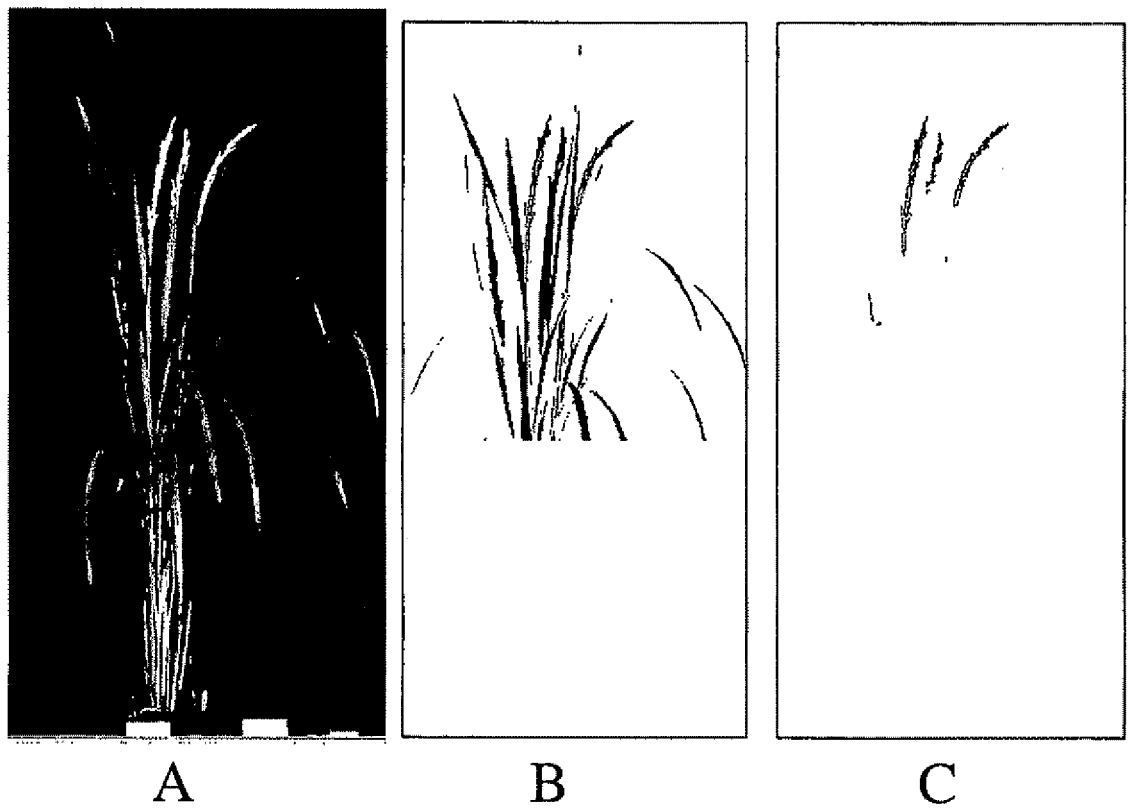
FIG. 2 shows digital images of rice plants from which the plant inflorescences may be measured. A shows the starting or original image, B shows the image after thresholding and C shows the image after colour variation analysis.
Figure 3:
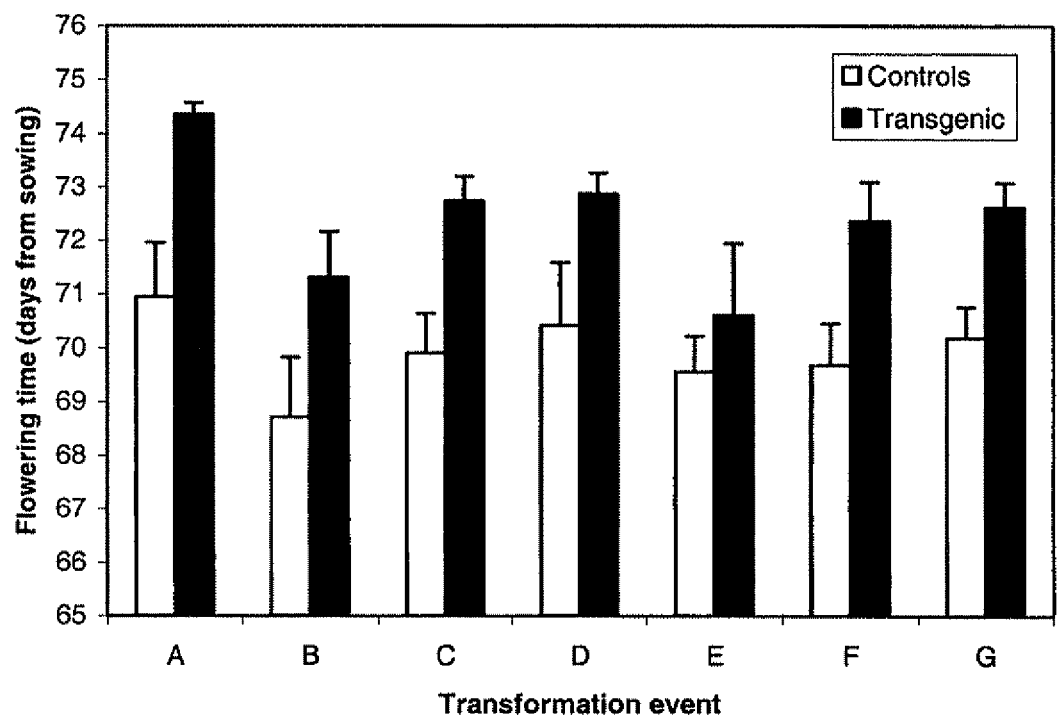
FIG. 3 is a graphical representation of the results of the experiment of Example 1.

The apparatus shown is housed in a greenhouse (not shown) which may have a number of areas which are treated differently to produce different environments. For example, the temperature and humidity of the areas may vary according to the needs of the particular plants being grown or according to the experimental setup. The apparatus comprises: a first transporter means (1) to support and move containers (2) shown as plant pots in FIGS. 1a and 1b in which one plant is growing in a growth-promoting medium. The containers (2) are moved along the first transporter means (1) to a station for imaging the plants and recording details of the images. The containers (2) are moved onto rotating plate (3) allowing rotation on a central vertical axis. A first pusher (4) is shown for moving container (2) from the first transporter means (1) onto the rotating plate (3). Camera (5) for recording pictures of the plants is placed horizontally at a suitable distance from rotating plate (3) and a light source (6) is placed horizontally at a suitable distance from rotating plate (3) to uniformly illuminate the plant. Computer (7), connected to camera (5), comprises appropriate software programs for collecting, storing, and analysing images taken by the camera. Unique identifier reader (8) is shown for reading the unique identifier associated with the plant or plants in container (2). Second transporter means (9) is shown for supporting and moving containers (2) back to their original location or to another location. A second pusher (10) moves containers (2) from the rotating plate (3) onto second transporter means (9).

The process for determining the start of flowering using the apparatus of the invention typically includes the following steps. The first transporter means (1) is set in motion to bring container (2) in front of rotating plate (3). First transporter means (1) is then stopped. First pusher (4) is activated and pushes container (2) onto rotating plate (3). Alternatively, the action of placing the plant on the rotating plate can be performed manually or by a robotic arm with a suitable gripper that can seize the plant and move it to a defined location. Container (2) on rotating plate (3) is rotated in front of the camera (5) and light source (6) is switched on. Light-source (6) is generally not switched off between each plant so as to ensure stable illumination at each cycle of picture acquisition. Camera (5) then starts taking pictures at regular intervals as soon as the rotating plate (3) is turning and stops after a complete revolution. The number of pictures taken per cycle is generally at least 3 and generally not more than 6. The unique identifier associated with the plant or plants in container (2) is read by the identifier reader (8) and sent through a data cable connection to computer (7). Camera (5) sends recorded pictures through a data cable connection to computer (7). The unique identifier of the plant (not shown) is linked to the images at the moment the images are stored and analysed. Preferably, the identifier is incorporated in the name of the image files when the image files are stored, but any naming system can be used to name the images provided that the identifier and the image names are linked unequivocally in a computer database. The presence and size of the inflorescences is deduced from the image using appropriate software and the results stored in a computer database with a link to the unique identifier of the plant. Second pusher (10) moves container (2) onto second transporter means (9) which is set in motion to take away container (2) from camera (5). Alternatively, the same action can be performed manually or by a robotic arm with a suitable gripper that can seize the plant and move it to a defined location.

EXAMPLE

The following example was carried out to demonstrate the invention. Table 1 below summarises the results of an experiment aimed at demonstrating that the presence of a particular gene construct confers an altered flowering time to transgenic rice plants transformed with the construct compared to control plants (siblings from the same mother plant as the transgenics, but that did not inherit the construct because of mendelian segregation).

The experiment involved 7 independent transformation attempts or transformation events, named A, B, C, D, E, F and G. For each event, 9 transgenic plants and 9 control plants were taken. Each plant was imaged once every 7 days, starting 10 days after sowing until maturity. The flowering time of each plant in the experiment was calculated as described hereinabove. Suitable statistical methods were applied to determine the level of significance of the differences found between transgenics and controls in each transformation event.

The data presented in Table 1 shows that all the transgenic plants gave a delay in flowering compared to control plants. The absolute differences ranged between 1.7 and 4.1 days, or between 2% and 6% in relative units. The difference was statistically significant ($P<0.05$) for events B, D, E, and it was highly significant ($P<0.01$) for events A, F, and G. Only event C was not statistically significant, although the p-value was very close to 0.05. The overall difference, across all events, was even more highly significant ($P<0.001$).

TABLE 1

| Transformation event | Flowering time (days after sowing) | | Absolute difference between transgenics and controls | Relative difference between transgenics and controls (%) | Significance level (p-value) |
|---|---|---|---|---|---|
| | Transgenics | Controls | | | |
| A | 74.0 | 71.2 | 2.8 | 4 | 0.0002 |
| B | 72.4 | 69.2 | 3.2 | 5 | 0.0237 |
| C | 73.4 | 71.3 | 2.1 | 3 | 0.0544 |
| D | 72.4 | 70.7 | 1.7 | 2 | 0.0463 |
| E | 72.6 | 69.5 | 3.1 | 4 | 0.0469 |
| F | 73.5 | 69.4 | 4.1 | 6 | 0.0003 |
| G | 73.0 | 69.4 | 3.6 | 5 | 0.0002 |
| Overall average | 73.0 | 70.1 | 2.9 | 4 | 0.0000 |

This experiment demonstrated that the method of the invention may be used to discriminate groups of plants differing in their flowering time by as little as 2 days or less. Furthermore, the method required only 9 individuals per experimental group with a frequency of imaging being every 7 days.

The invention claimed is:

1. A method for determining the start of flowering of an individual plant of a particular species, comprising:
   (i) digitally imaging inflorescence of an individual plant;
   (ii) measuring the inflorescence of said individual plant from the digital image;
   (iii) providing an average growth rate of inflorescence for said particular species of plant; and
   (iv) comparing the inflorescence of said individual plant measured in step ii) to the average growth rate of inflorescence provided in step iii) to determine the start of flowering of said individual plant.

2. The method of claim 1, wherein said inflorescence is imaged before the inflorescence reaches its maximum size.

3. The method of claim 1, wherein said inflorescence is imaged at least every 7 days until plant maturity.

4. The method of claim 1, further comprising selecting plants having altered flowering time compared to control plants.

5. The method of claim 1, wherein said plant is a cereal.

6. The method of claim 1, wherein the plant is rice, wheat, or corn.

7. The method of claim 1, wherein from 3 to about 6 images are taken and used for measuring the inflorescence of said individual plant.

8. An apparatus for high-throughput determination of the start of flowering of an individual plant of a particular species within a number of plants in containers, which comprises:
   (i) a transporter for supporting and moving containers in which the number of plants are growing and for positioning an individual plant for digital imaging;
   (ii) one or more digital cameras with sufficient resolution for imaging emerging plant inflorescences of the individual plant; and
   (iii) computer means associated with the at least one digital camera for detecting and measuring the plant inflorescence of said individual plant and comparing the measured inflorescence of said individual plant to the average growth rate of inflorescence for said particular species of plant to thereby determine the start of flowering for said individual plant.

9. The apparatus of claim 8, wherein said container comprises an associated unique identifier.

10. The apparatus of claim 8, wherein said one or more digital cameras allowing the inflorescences imaged to have a minimum size of about 100 pixels.

11. A method for breeding plants having altered flowering time compared to control plants comprising utilizing the apparatus of claim 8 for determining the start of flowering and selecting plants having altered flowering time compared to control plants.

* * * * *

UNITED STATES PATENT AND TRADEMARK OFFICE
CERTIFICATE OF CORRECTION

PATENT NO. : 8,559,679 B2  
APPLICATION NO. : 12/279353  
DATED : October 15, 2013  
INVENTOR(S) : Lejeune et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1285 days.

Signed and Sealed this

Fifteenth Day of September, 2015

Michelle K. Lee
*Director of the United States Patent and Trademark Office*